Sept. 26, 1950 G. H. STONER ET AL 2,523,399
NULL BALANCE FREQUENCY METER
Filed Jan. 19, 1946

INVENTORS
CECIL K. STEDMAN
GEORGE H. STONER
BY
*Glenn Orlob*
AGENT

Patented Sept. 26, 1950

2,523,399

UNITED STATES PATENT OFFICE 2,523,399

NULL-BALANCE FREQUENCY METER

George H. Stoner and Cecil K. Stedman, Seattle, Wash., assignors to Boeing Airplane Company, a corporation of Delaware Application January 19, 1946, Serial No. 642,406

12 Claims. (Cl. 175—368)

Our invention relates to a new and useful electronic circuit for accurately measuring the frequency of electrical signals by means of a null-balance system. An electronic circuit employing the principles of this invention is particularly adaptable for use as a control device for automatic speed regulation, or as a precise tachometer when used in conjunction with a photoelectric, magnetic, or other type of pickup which provides a signal having a frequency proportional to shaft speed.

Heretofore, the null-balance principle has been extensively employed in frequency meters utilizing bridge circuits, such as the Wien bridge circuit, which contain only resistors and condensers. It has been found, however, that frequency meters now known to the art either are not sufficiently accurate for use in tachometer and speed regulation applications, or are not continuously adjustable over a wide frequency range. Bridge type frequency meters are continuously adjustable, but the associated filters usually necessary to eliminate harmonics from the signal being measured are not conveniently adjustable from one frequency to another.

It is the principal object of this invention to provide a direct-reading electronic frequency meter which is continuously adjustable over a wide frequency range, and which will indicate the frequency of signals containing strong harmonic components with sufficient accuracy to permit the meter to be used in tachometer and automatic speed regulation applications.

Other objects of the invention will appear from the following description taken in connection with the drawing, which forms a part of the specification, and in which.

Figure 1:
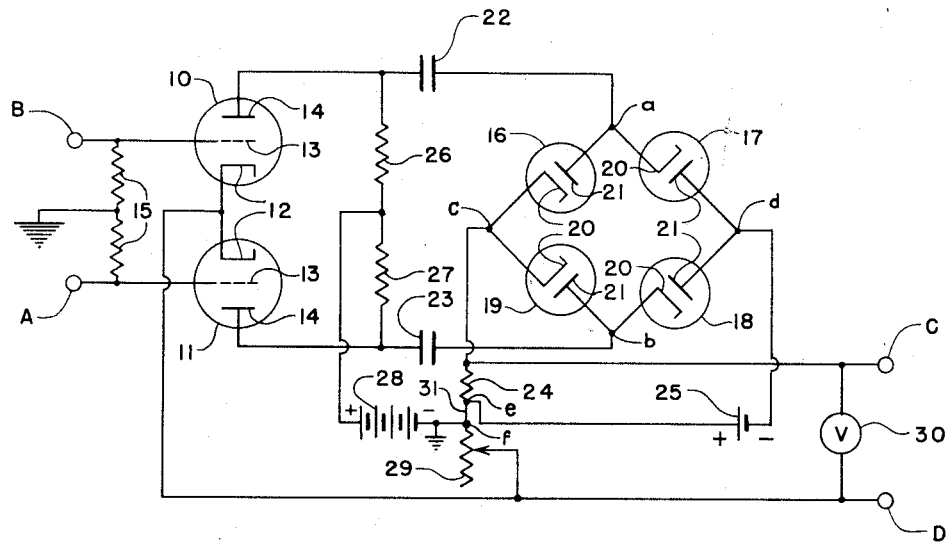
Figure 1 is a schematic diagram illustrating the circuit and apparatus employed in the preferred form of the invention.

Referring to the drawing for more specific details of the invention, 10 and 11 represent a pair of tubes connected in a push-pull arrangement, each having a cathode 12, control grid 13 and an anode 14. The cathodes 12 have a common electrical potential, and signals applied to the control grids 13 through the input terminals A and B are shunted to ground through the series input resistors 15.

Diode tubes 16, 17, 18 and 19, each having a cathode 20 and an anode 21, are connected as a bridge rectifier. Junctions $a$ and $b$ of the diode bridge are symmetrically connected to the anodes 14 of tubes 10 and 11 through identical high-stability mica condensers 22 and 23. The common cathode junction $c$ of the bridge is connected in series with the rectifier output resistor 24. The common anode junction $d$ is connected to ground through the battery 25, which prevents the contact potentials of the diodes from sending current due to thermionic emission through the rectifier output resistor 24.

Positive potential is supplied to the anodes 14 and to the condensers 22 and 23 through identical preferably wire-wound resistors 26 and 27 from the battery 28.

Connected between ground and the cathodes 12 of the tubes 10 and 11 is the discharge current resistor 29, which is preferably an accurate decade resistance box. A D.-C. voltmeter 30, preferably of the high impedance type, is connected between the frequency meter output terminals C and D to indicate the average voltage existing across the two series resistors 24 and 29.

The operation of the preferred form of the invention disclosed in the drawings is as follows: A square wave of voltage, derived by the use of suitable trigger circuits from the signal whose frequency is to be measured, is applied to the input terminals A and B in such a way that during one-half cycle the potential applied to terminal A is within the operating range of the tube 11 and terminal B is sufficiently negative to drive tube 10 to cut-off. During the period of cut-off no voltage drop due to tube current occurs in the resistor 26, and the condenser 22 will become charged to approximately the potential of battery 28. The charging path is from ground, through battery 28, resistor 26, condenser 22, diode tube 16, rectifier output resistor 24, and back to ground.

During the next half-cycle the signal applied to terminal B is within the operating range of tube 10 and terminal A is sufficiently negative to drive tube 11 to cut-off, so that tube 10 will conduct and allow the potential of its anode 14 to drop by an amount $IR_{26}$, where $I$ is the steady state plate current of the tube. The potential across the condenser 22 will drop by the same amount $IR_{26}$, the discharge path being to ground through tube 10 and resistor 29 and thence back to the condenser 22 through battery 25 and diode 17.

Figure 2:
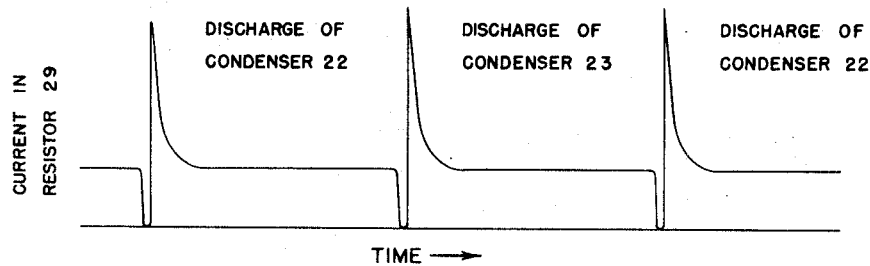
Figures 2 and 3 are current-time curves illustrating the flow of charging and discharging current for the anode circuit condensers shown in Figure 1.
Figure 3:
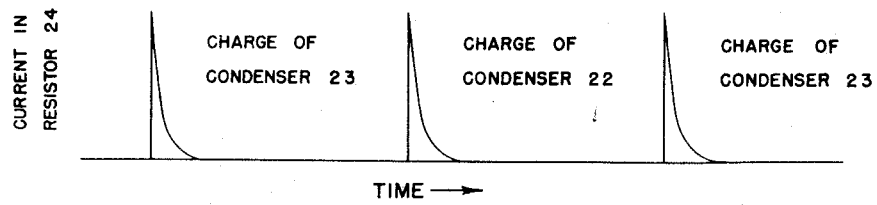

Since the electronic circuits are symmetrical, a similar charging and discharging of condenser 23 produces identical current pulses at alternate half-cycle intervals of the driving signal voltage, with the result that the charging current for the condensers 22 and 23 flows through the resistor 24 in the manner illustrated in Figure 3, and the discharging current of the condensers 22 and 23 flowing through the resistor 29 takes the form shown in Figure 2. The resistor 24, therefore, carries only the transient charging current of condensers 22 and 23, while the resistor 29 carries the steady state current of the tubes 10 and 11 in addition to part of the transient discharge current of the condensers 22 and 23.

In order to utilize this circuit as a frequency meter, it is only necessary to adjust discharge resistor 29 so that the average voltage developed across this resistor equals the average voltage across the rectifier output resistor 24. When this has been done the voltmeter 30 will indicate zero. If the frequency of the driving voltage applied to terminals A and B is raised, the heights and durations of the peaks in Figures 2 and 3 will not change, but they will move closer together. The average current through resistor 24 is thus proportional to the frequency. On the other hand, the average current in resistor 29 is practically independent of frequency because the area of the discharge current peaks is only a fraction of the total area under the curve shown in Figure 2. Consequently, the adjusted value of the resistor 29 required to balance the voltmeter 30 to zero will be very nearly proportional to the frequency of the signal applied to the input terminals A and B.

The equation of balance will now be derived. Since the circuit is symmetrical either of the identical wire-wound resistors 26 and 27 can be represented by the single symbol R, and either of the high-stability mica condensers 22 and 23 can be represented by the symbol C. $R_p$ indicates the anode resistance, I the steady-state anode current of either of the tubes 10 and 11 (viz. with the positive square wave voltage applied to its grid), $f$ the frequency of the signal voltage applied to the terminals A and B, $R_{24}$ the value of the rectifier output resistor 24, and $R_{29}$ the adjusted value of the discharge resistor 29 required to balance the voltmeter 30 to zero. Each time a condenser C is charged its voltage rises by an amount IR, and its charge rises by an amount CIR. The number of such charging pulses passing through $R_{24}$ per second is $2f$. Consequently the average voltage across $R_{24}$ is $2fCIRR_{24}$. Similarly, it can be shown that the average voltage across $R_{29}$ is $$R_{29}I + \frac{IR_{29}R^2}{R+R_p+R_{29}}C \times 2f \quad (1)$$

If $R_{29}$ is adjusted until the voltmeter 30 reads zero, then these two average voltages are equal, and $$2fCIRR_{24} = R_{29}I + \frac{IR_{29}R^2}{R+R_p+R_{29}}C \times 2f \quad (2)$$

Solving for $f$:

$$f = \frac{R_{29}}{2RC\left[R_{24} - \frac{RR_{29}}{R+R_p+R_{29}}\right]} \quad (3)$$

Since the expression $$\frac{RR_{29}}{R+R_p+R_{29}}$$

in the denominator varies with $R_{29}$ from zero to a very small percentage of the resistance of $R_{24}$, the calibration curve of $f$ as a function of $R_{29}$ is very nearly a straight line, or $$f \approx \frac{R_{29}}{2RCR_{24}} \quad (4)$$

If an electronic circuit employing the principles of this invention is to be used as a frequency meter, it is only necessary to vary the discharge resistor 29 until the voltmeter 30 reads zero, and then compute the input signal frequency by means of Equation 3 or 4, or obtain the frequency value directly from a calibration curve previously prepared by comparison with a frequency standard. The required zero indication of the voltmeter 30 could also be accomplished by maintaining the value of the discharge resistor 29 at fixed value and varying the value of the resistor 24.

A circuit constructed according to this invention can be used as a speed regulator control if discharge resistor 29 is adjusted so that the voltmeter 30 reads zero when a pickup device on the shaft rotating at the desired speed is supplying substantially square wave voltage impulses via a suitable trigger circuit to the signal input terminals A and B. Variations in speed of the shaft will then produce an error voltage at the output terminals C and D which can be smoothed in a suitable electrical filter and impressed upon a servo amplifier for speed control purposes. Accordingly, the term "meter," as used herein, is intended to include all useful applications of the circuit, such as those herein disclosed, having to do with frequency detection and/or measurement and applications thereof.

Equation 4 shows that the only components which materially affect the calibration are the condenser C and the resistors $R_{29}$, $R_{24}$, and R ($R_{26}$ and $R_{27}$ in Figure 1). If these components are stable and have low temperature coefficients, the performance of the circuit as a frequency meter or as a speed regulator will be accurate and stable. The stability of the circuit is also increased by the fact that the voltages across resistors 24 and 29 are both proportional to the steady state anode current I so that variations due to tube characteristics and battery voltages cancel out. Changes in the contact potentials of the tubes resulting from changes in heater voltage are small compared with the charging potential of the battery 28. Equation 3 shows that moderate variations in the anode resistance $R_p$ of the tubes 10 and 11 have only a minor effect on the frequency calibration.

While the circuit shown in Figure 1 is arranged to utilize an input balanced to ground, a single-ended input can be provided if desired. In this modification, the charging condenser 23, the resistor 27, the tube 11, one of the input resistors 15, and the rectifiers 18 and 19 can be eliminated from the circuit without departing from the principles of this invention.

Similarly, the output circuit can be modified to obtain a single-ended output by interchanging the wire 31 with the voltmeter 30 so that a shorting wire is present across the terminals C and D when the voltmeter 30 is connected between the terminals e and f. In this case battery 25 must be a separate battery, whereas in Figure 1 battery 25 and battery 28 can be parts of a single battery or a voltage divider from a single power supply.

Any mechanical device producing substantially square wave switching may be substituted for the pair of tubes 10 and 11, and types of tubes other than the triode and diode types illustrated in the drawing can be adapted to the circuit arrangement herein described.

It is also recognized that any equivalent bridge rectifier, such as a copper oxide bridge rectifier, can be substituted for the specific arrangement shown to accomplish separation of the charging and discharge currents of the condensers 22 and 23.

For the purposes of explaining the invention a particular embodiment thereof has been described in detail. It is understood, however, that many changes can be made from the particular construction described without departing from the invention, and we do not intend to be limited to the circuit arrangement shown except as such limitations are clearly imposed by the appended claims.

We claim:

1. In a frequency responsive device the combination comprising: an amplifier tube having anode, cathode and control grid; a source of anode potential for said tube; an input circuit connected to said grid for application to said grid of an input signal, such as a square wave, of a frequency to be responded to; a load resistor connected between said source and said anode; a charging condenser connected at one side to said anode; a rectifier circuit connected between the other side of said condenser and the negative side of said source, operable to effect charging from said source and discharging of said condenser through said tube in a small fraction of one cycle of said signal, said rectifier circuit comprising two rectifiers connected one with an anode terminal, and one with a cathode terminal, to said condenser, and with their respective remaining anode and cathode terminals returning to the negative side of said source, and condenser-current resistor means interposed in the return lead of one of said respective remaining terminals; cathode resistor means connected between said amplifier tube cathode and the negative side of said source; and an output circuit having connections respectively to said cathode resistor means at its side nearest said amplifier tube cathode, and to said condenser-current resistor means at its side away from said negative side of said source, whereby variations in frequency effect proportionate potential differences between said output circuit connections substantially independently of changes in voltage of said source.

2. In a frequency responsive device the combination comprising: an amplifier tube having anode, cathode and control grid; a source of anode potential for said tube; an input circuit connected to said grid for application to said grid of an input signal, such as a square wave, of a frequency to be responded to; a load resistor connected between said source and said anode; a charging condenser connected at one side to said anode; a rectifier circuit connected between the other side of said condenser and the negative side of said source, operable to effect charging from said source and discharging of said condenser through said tube in a small fraction of one cycle of said signal, said rectifier circuit comprising two diode rectifiers connected one with an anode terminal and one with a cathode terminal to said condenser, and with their respective remaining anode and cathode terminals returning to the negative side of said source, condenser-current resistor means interposed in the return lead of one of said respective remaining terminals, and rectifier bias means interposed in the return lead of the other of said respective terminals to prevent flow of quiescent diode rectifier emission current in said lead; cathode resistor means connected between said amplifier tube cathode and the negative side of said source; and an output circuit having connections respectively to said cathode resistor means at its side nearest said amplifier tube cathode, and to said condenser-current resistor means at its side away from said negative side of said source, whereby variations in frequency effect proportionate potential differences between said output circuit connections substantially independently of changes in voltage of said course.

3. The device as defined in claim 1 in which one of the latter two resistor means named is made variable to enable effecting a balance as between voltage drop in such resistor means and the other resistor means, one caused by anode current in the vacuum tube and the other by unidirectional current flow through the condenser.

4. The device as defined in claim 1 in which one of the resistor means named is made variable to enable effecting a balance as between voltage drop in such resistor means and the other resistor means, one caused by anode current in the vacuum tube and the other by unidirectional current flow through the condenser, and voltage averaging means operable to indicate potential differences between the output circuit connections.

5. A frequency measuring device comprising normally closed switch means, a load resistor and a source of potential connected respectively in series, means to effect opening said switch means intermittently at the frequency to be measured, a capacitor connected across said switch means and connected in series with said resistor and said source, normally to charge said capacitor substantially fully in periods intermediate to opening said switch means, whereby closing said switch means effects discharge of said capacitor, rectifier means comprising two rectifiers with electrode elements connected in inverted circuit relation, interposed in separate parallel circuits and together connected in series with said capacitor, one of said separate circuits including a resistor connected to carry unidirectional current flowing in said capacitor, another resistor connected to carry current flowing through said switch means, said resistors being so connected in the combined circuit that one end of one resistor is connected to one end of the other resistor to be affected alike by circuit potential variation, and voltage sensitive means connected between the opposite ends of said resistors, responsive to average current differences therein, representing frequency being measured.

6. A frequency measuring device comprising normally closed switch means, a load resistor and a source of potential connected respectively in series, means to effect opening said switch means intermittently at the frequency to be measured, a capacitor connected across said switch means and connected in series with said resistor and said source normally to charge said capacitor substantially fully in periods intermediate to opening said switch means, whereby closing said switch means effects discharge of said capacitor, rectifier means comprising two rectifiers with electrode elements connected in inverted circuit relation and interposed in separate parallel circuits, together connected in series with said capacitor, a first resistor means subjected to flow of current in said switch means, a second resistor means in one of said separate circuits, subjected to unidirectional flow of current in said capacitor, one end of each resistor being connected directly to that of the other, and voltage responsive means having terminals connected to said resistor means, respectively, at points away from said commonly connected ends thereof, to respond to differences in average current flowing through said first and second resistor means, representing frequency being measured.

7. In a device of the character described, the combination of charging means, including intermittently actuable switching means responsive to an input signal of a frequency to be determined, a load resistor, and an electric potential source connected respectively in series, a condenser connected to said switching means to be discharged intermittently thereby, a rectifier circuit connected between the side of said condenser remote from its connection to said switching means, and to the opposite side of said switching means, adapted to separate the charging current from the discharging current of said condenser into separate circuit paths, a rectifier output resistor connected in one of said circuit paths through which said condenser is charged, for producing a voltage drop proportional to the charging current of said condenser, a discharge resistor for said condenser connected in series with said switch means, to produce a voltage drop proportional to the current flowing through said load resistor, the circuit constants being such that the average voltage drop in said discharge resistor is substantially independent of frequency of said signal, and indicator means connected between opposite-polarity ends of said discharge and rectifier output resistors operable to indicate differences between the average voltage drop existing in said rectifier output resistor and the average voltage drop existing in said discharge resistor, as determined by the signal frequency.

8. An electronic circuit responsive to variations in the frequency of electric signals, comprising square-wave-signal responsive switching means including a pair of amplifier tubes connected in push-pull arrangement to receive a square wave signal applied to control elements of said tubes with opposite polarity, respectively, a source of anode potential common to said tubes, a pair of load resistors respectively connected in the anode circuits of said tubes for limiting the anode current in said tubes, a pair of condensers, each connected at one side to the anode of a different one of said tubes and thereby adapted to be discharged intermittently at the square wave frequency, coacting condenser charging and discharging circuit means comprising a diode bridge rectifier circuit connected at opposite junctures to the other sides of said condensers, respectively, to afford separate individual charging and discharging paths therefor, a rectifier output resistor connected in series with said bridge rectifier circuit at a different juncture therein and to the negative side of said source, to combine the individual component paths of one of said separate charging and discharging paths, and to sustain a voltage drop proportional to the combined average of the corresponding charging or discharging currents in both of said condensers flowing through such rectifier output resistor, a discharge resistor for said condensers connected in a common return lead for the cathodes of said tubes, the circuits constants being such relatively that said discharge resistor has a voltage drop therein substantially proportional to the combined average of the current flowing in said pair of load resistors, the resistance of said tubes having substantially no effect upon such proportionality, and the discharge current of said condensers flowing through said discharge resistor producing an average voltage drop therein which is negligible compared to the total average voltage drop therein and rectifier bias means connected to said rectifier circuit at a juncture opposite said different juncture to prevent diode emission current flowing in said bridge circuit.

9. The method of measuring frequency of a recurring symmetrical voltage wave, comprising applying such wave with opposite polarity to the control elements of push-pull connected amplifiers supplied from a common anode voltage source, discharging different condensers in time alternation by alternate conduction of said tubes, respectively, such conduction occurring only during the initial portions of the recurring positive portions of said wave applied to each amplifier, combining the anode currents of said amplifiers in a resistor to produce a reference voltage drop made up only in negligible amount by condenser discharge current and largely of anode current produced by said positive wave portions, charging said condensers in time alternation from said source during the periods between their respective discharge periods, combining the charging currents of said condensers in a second resistor to produce an average charging voltage drop, and measuring the difference between said reference voltage drop and said charging voltage drop to determine accurately the frequency of said wave.

10. The method of determining frequency of a recurring symmetrical voltage wave comprising applying such wave with opposite polarity to the control elements of push-pull connected amplifiers supplied from a common anode voltage source, discharging different condensers in time alternation by alternate conduction of said tubes, respectively, such conduction occurring only during the initial portion of the recurring positive portions of said wave applied to each amplifier, combining the anode currents of said amplifiers in a resistor to produce a reference voltage drop made up only in negligible amount by condenser discharge current and largely of anode current produced by said positive wave portions, charging said condensers in time alternation from said source during the periods between their respective discharge periods, combining the charging currents of said condensers in a second resistor to produce an average charging voltage drop, detecting differences between said reference voltage drop and said charging voltage drop, and varying one of said resistors to effect a balance between said drops in voltage, such that the setting of the resistor so varied becomes substantially proportional to the frequency of the wave.

11. The method of determining frequency of a recurring symmetrical voltage wave comprising applying such wave with opposite polarity to the control elements of push-pull connected amplifiers supplied from a common anode voltage source, discharging different condensers in time alternation by alternate conduction of said tubes, respectively, such conduction occurring only during the initial portions of the recurring positive portions of said wave applied to each amplifier, combining the anode currents of said amplifiers in a single resistor to produce a reference voltage drop made up only in negligible amount by condenser discharge current and largely of anode current produced by said positive wave portions, charging said condensers in time alternation from said source during the periods between their respective discharge periods, combining the components of one of said discharging or charging currents of said condensers in a second resistor to produce an average voltage drop representing frequency, detecting differences between said reference voltage drop and said frequency-representing voltage drop, and varying one of said resistors to effect a balance between said drops in voltage, such that the setting of the resistor so varied becomes substantially proportional to the frequency of the wave.

12. A frequency measuring device comprising: an amplifier tube having anode, cathode and control grid; a source of anode potential for said tube; an input circuit connected to said grid for application to said grid of an input signal, such as a square wave, of a frequency to be measured; a load resistor connected between said source and said anode; a charging condenser connected at one side to said anode; a rectifier circuit connected between the other side of said condenser and the negative side of said source, operable to effect charging from said source and discharging of said condenser through said tube in a small fraction of one cycle of said input signal, said rectifier circuit comprising two rectifiers connected one with an anode terminal, and one with a cathode terminal, to said condenser, and with their respective remaining anode and cathode terminals returning to the negative side of said source, and condenser-current resistor means interposed in the return lead of one of said respective remaining terminals; cathode resistor means connected between said amplifier tube cathode and the negative side of said source; one of said condenser-current resistor means or said cathode resistor means being variable; and voltage indicator means having input terminals connected respectively to said cathode resistor means at its side nearest said amplifier tube cathode, and to said condenser-current resistor means at its side away from said negative side of said source, and operable to indicate differences in voltage drop across such resistors and thereby to indicate the condition of balance therebetween effected by adjustment of the variable resistor means, such resistor means adjustment thereupon representing frequency being measured.

GEORGE H. STONER.
CECIL K. STEDMAN.

REFERENCES CITED

The following references are of record in the file of this patent:

UNITED STATES PATENTS

| Number | Name | Date |
|---|---|---|
| 1,601,070 | Horton | Sept. 28, 1926 |
| 1,665,857 | Needham | Apr. 10, 1928 |
| 1,809,683 | Fitzgerald | June 9, 1931 |
| 2,026,421 | Fecker | Dec. 31, 1935 |
| 2,260,933 | Cooper | Oct. 28, 1941 |
| 2,366,076 | Wilbur | Dec. 26, 1944 |

OTHER REFERENCES

"Electronic Tachometer," article in Electronic Industries, March 1945, pages 80, 81, 208.